United States Patent
Costea et al.

(10) Patent No.: US 10,360,056 B2
(45) Date of Patent: *Jul. 23, 2019

(54) REDEPLOYING A BASELINE VIRTUAL MACHINE TO UPDATE A CHILD VIRTUAL MACHINE BY CREATING AND SWAPPING A VIRTUAL DISK COMPRISING A CLONE OF THE BASELINE VIRTUAL MACHINE

(71) Applicant: NetApp Inc., Sunnyvale, CA (US)

(72) Inventors: George Costea, Durham, NC (US); Eric Forgette, Mechanicsville, VA (US)

(73) Assignee: NetApp Inc., Sunnyvale, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/242,773

(22) Filed: Aug. 22, 2016

(65) Prior Publication Data
US 2016/0357594 A1 Dec. 8, 2016

Related U.S. Application Data

(63) Continuation of application No. 14/523,791, filed on Oct. 24, 2014, now Pat. No. 9,424,066, which is a
(Continued)

(51) Int. Cl.
*G06F 9/455* (2018.01)
*G06F 8/65* (2018.01)
(Continued)

(52) U.S. Cl.
CPC ............ *G06F 9/45558* (2013.01); *G06F 8/60* (2013.01); *G06F 8/65* (2013.01); *G06F 15/16* (2013.01);
(Continued)

(58) Field of Classification Search
CPC .......... G06F 9/45558; G06F 8/60; G06F 8/65; G06F 2009/4557; G06F 2009/45562; G06F 15/16
See application file for complete search history.

(56) References Cited

U.S. PATENT DOCUMENTS 6,108,697 A 8/2000 Raymond et al.
6,453,469 B1 9/2002 Jystad
(Continued)

OTHER PUBLICATIONS

Non-Final Office Action cited in U.S. Appl. No. 12/750,885 dated Nov. 8, 2013, 17 pgs.
(Continued)

*Primary Examiner* — Benjamin C Wu
(74) *Attorney, Agent, or Firm* — Cooper Legal Group, LLC

(57) ABSTRACT

One or more techniques and/or systems are disclosed for redeploying a baseline VM (BVM) to one or more child VMs (CVMs) by merely cloning virtual drives of the BVM, instead of the entirety of the parent BVM. A temporary directory is created in a datastore that has the target CVMs that are targeted for virtual drive replacement (e.g., are to be "re-baselined"). One or more replacement virtual drives (RVDs) are created in the temporary directory, where the RVDs comprise a clone of a virtual drive of the source BVM. The one or more RVDs are moved from the temporary directory to a directory of the target CVMs, replacing existing virtual drives of the target CVMs so that the target CVMs are thus re-baselined to the state of the parent BVM.

20 Claims, 12 Drawing Sheets

Related U.S. Application Data continuation of application No. 12/750,885, filed on Mar. 31, 2010, now Pat. No. 8,898,668.

(51) Int. Cl.
*G06F 8/60* (2018.01)
*G06F 15/16* (2006.01)

(52) U.S. Cl.
CPC ............... *G06F 2009/4557* (2013.01); *G06F 2009/45562* (2013.01)

(56) References Cited

U.S. PATENT DOCUMENTS

| | | | |
|---|---|---|---|
| 7,356,679 B1 * | 4/2008 | Le | G06F 17/30067 707/E17.01 |
| 7,546,354 B1 | 6/2009 | Fan et al. | |
| 7,630,381 B1 * | 12/2009 | Roskind | G06F 8/65 370/395.42 |
| 7,840,955 B1 * | 11/2010 | Weathersby | G06F 8/60 717/168 |
| 8,046,550 B2 | 10/2011 | Feathergill | |
| 8,126,847 B1 * | 2/2012 | Zheng | G06F 11/1469 707/640 |
| 8,135,930 B1 | 3/2012 | Mattox et al. | |
| 8,171,201 B1 | 5/2012 | Edwards, Sr. | |
| 8,239,646 B2 | 8/2012 | Colbert et al. | |
| 8,255,650 B1 * | 8/2012 | Gruttadauria | G06F 9/45558 711/162 |
| 8,429,649 B1 | 4/2013 | Feathergill et al. | |
| 8,578,126 B1 | 11/2013 | Gaonkar et al. | |
| 8,677,351 B2 | 3/2014 | Le et al. | |
| 8,756,598 B1 * | 6/2014 | Costea | G06F 9/45558 717/174 |
| 8,793,465 B1 | 7/2014 | Forgette et al. | |
| 8,819,383 B1 | 8/2014 | Jobanputra et al. | |
| 8,898,668 B1 | 11/2014 | Costea et al. | |
| 8,996,468 B1 | 3/2015 | Mattox | |
| 2003/0093570 A1 | 5/2003 | Bissett | |
| 2005/0278280 A1 | 12/2005 | Semerdzhiev et al. | |
| 2006/0184926 A1 | 8/2006 | Or et al. | |
| 2006/0277542 A1 * | 12/2006 | Wipfel | G06F 8/61 717/174 |
| 2007/0266037 A1 | 11/2007 | Terry et al. | |
| 2008/0028402 A1 | 1/2008 | Senoo | |
| 2008/0134178 A1 | 6/2008 | Fitzgerald et al. | |
| 2008/0144471 A1 | 6/2008 | Garapati et al. | |
| 2008/0148248 A1 | 6/2008 | Volkmer et al. | |
| 2008/0209414 A1 | 8/2008 | Stein | |
| 2008/0215796 A1 | 9/2008 | Lam et al. | |
| 2008/0222234 A1 | 9/2008 | Marchand | |
| 2009/0083404 A1 | 3/2009 | Lanzmeier et al. | |
| 2009/0125904 A1 | 5/2009 | Nelson | |
| 2009/0198805 A1 | 8/2009 | Ben-Shaul et al. | |
| 2009/0216975 A1 | 8/2009 | Halperin et al. | |
| 2009/0292737 A1 | 11/2009 | Hayton | |
| 2009/0300076 A1 * | 12/2009 | Friedman | G06F 11/3664 |
| 2009/0300082 A1 | 12/2009 | Chen et al. | |
| 2010/0070725 A1 | 3/2010 | Prehlad et al. | |
| 2010/0077162 A1 | 3/2010 | Kaneko et al. | |
| 2010/0257523 A1 | 10/2010 | Frank | |
| 2011/0035802 A1 | 2/2011 | Arajujo, Jr. et al. | |
| 2011/0125977 A1 | 5/2011 | Karr et al. | |
| 2011/0208931 A1 | 8/2011 | Penderharkar et al. | |
| 2012/0185427 A1 | 7/2012 | Fontignie et al. | |
| 2015/0169252 A1 | 6/2015 | Krishnamurthi et al. | |
| 2015/0331707 A1 * | 11/2015 | Hellkvist | G06F 8/63 718/1 |
| 2015/0373102 A1 * | 12/2015 | Antony | H04L 67/1095 709/219 |
| 2018/0011871 A1 * | 1/2018 | Kroll | G06F 9/45558 |

OTHER PUBLICATIONS

Reply Non-Final Office Action cited in U.S. Appl. No. 12/750,885 dated Jan. 24, 2014, 15 pgs.
Final Office Action cited in U.S. Appl. No. 12/750,885 dated Jun. 4, 2014, 13 pgs.
Reply Final Office Action cited in U.S. Appl. No. 12/750,885 dated Jul. 23, 2014, 12 pgs.
Notice of Allowance cited in U.S. Appl. No. 12/750,885 dated Aug. 27, 2014, 14 pgs.
Non-Final Office Action cited in U.S. Appl. No. 14/523,791 dated Jul. 16, 2015, 29 pgs.
Reply Non-Final Office Action cited in U.S. Appl. No. 14/523,791 dated Oct. 16, 2015, 12 pgs.
Notice of Allowance cited in U.S. Appl. No. 14/523,791 dated Jan. 6, 2016, 12 pgs.
"Best Practices for File System Alignment in Virtual Environments", Abhinav Joshi, Eric Forgette and Peter Learmonth, Mar. 2009, 25 pgs.
"Storage Block Alignment with VMware Virtual Infrastructure", Jul. 2007, 10 pgs.

* cited by examiner

REDEPLOYING A BASELINE VIRTUAL MACHINE TO UPDATE A CHILD VIRTUAL MACHINE BY CREATING AND SWAPPING A VIRTUAL DISK COMPRISING A CLONE OF THE BASELINE VIRTUAL MACHINE

RELATED APPLICATIONS

This application claims priority to and is a continuation of U.S. application Ser. No. 14/523,791, filed on Oct. 24, 2014, now allowed, titled "VIRTUAL MACHINE REDEPLOYMENT," which claims priority to and is a continuation of U.S. application Ser. No. 12/750,885, filed on Mar. 31, 2010, now issued as U.S. Pat. No. 8,898,668, currently titled "REDEPLOYING BASELINE VIRTUAL MACHINE TO UPDATE A CHILD VIRTUAL MACHINE BY CREATING AND SWAPPING A VIRTUAL DISK COMPRISING A CLONE OF THE BASELINE VIRTUAL MACHINE," both which are incorporated herein by reference.

FIELD

The instant disclosure pertains to clustered storage systems, and more particularly to redeploying one or more virtual machines therein.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

When linking remote (or even locally dispersed) locations that require access to stored data, and/or to promote the continued availability of such data in the event of hardware, software, or even site failures (e.g., power outages, sabotage, natural disasters), entities have developed clustered networks that link disparate storage mediums to a plurality of clients, for example. Typically, to access data, one or more clients can connect to respective nodes of a clustered storage environment, where the nodes are linked by a cluster fabric that provides communication between the disparate nodes. Nodes can be dispersed locally, such as in a same geographical location, and/or dispersed over great distances, such as around the country.

A virtual server environment can comprise multiple physical controllers, such as servers, that access a distributed data storage and management system. Respective controllers may comprise a plurality of virtual machines (VMs) that reside and execute on the controller. The VM (a.k.a.: virtual server or virtual desktop) may comprise its own operating system and one or more applications that execute on the controller. As such, a VM can function as a self-contained desktop environment, for example, on the controller, emulated on a client attached to the controller, and multiple operating systems may execute concurrently on the controller.

VMs on a controller can be configured to share hardware resources of the controller, and if connected to a distributed data storage and management system (cluster), share hardware resources of the cluster. A VM monitor module/engine (hypervisor) may be used to manage the VMs on respective controllers, and also virtualize hardware and/or software resources of the controllers in the cluster for use by the VMs. Clients can be connected to the cluster and used to interface/interact with a particular VM, and emulate a desktop environment, such as a virtual desktop environment, on the client machine. From the viewpoint of a client, the VM may comprise a virtual desktop, or server that appears as an actual desktop machine environment or physical server.

Multiple VMs executing may be logically separated and isolated within a cluster to avoid conflicts or interference between applications of the different VMs. In this way, for example, a security issue or application crash in one VM may not affect the other VMs on the same controller, or in the cluster. Further, a preferred version of a VM may be cloned and deployed throughout a cluster, and transferred between controllers in the virtual server environment.

Often, a preferred version of a VM (baseline VM) is cloned a plurality of times and deployed, such as in a same controller or over a cluster, for access by attached clients. For example, virtual desktop infrastructures (VDIs) utilize cloned VMs to emulate desktop environments on clients, such as in secure working environments, and/or where retaining data for a cloned baseline VM may not be necessary. In this example, important information may be maintained on the controller or cluster, while transient data is destroyed when the baseline VM is redeployed to the clones. Redeploying a baseline VM to the clones (e.g., child VMs, comprising clones of a parent VM, such as the baseline VM) can also be used when software or configuration updates have been performed on the baseline VM, and these updates can be easily rolled out to the child VMs by redeploying the baseline. As an example, a baseline VM may be known as a parent VM and the clones from the baseline VM may be known as children (child) VMs, such that the parent VM can be redeployed to the children VMs, thus "re-baselining" the children VMs to a desired (baseline) state.

Currently, child VMs can be refreshed back to the baseline VM state, such as after changes have been made to the child VM. The refresh utility uses a copy-on-write delta file that logs any changes made to a particular child. These copy-on-write files can become quite large over time, if not refreshed, as a plurality of changes are made to the child. Further child VMs can be recomposed, which allows patches and software updates to be pushed out the child VMs from the baseline VM. A snapshot file is created of the baseline VM and rolled out to the children using a form of replication of the baseline VM.

Presently, redeploying a baseline VM to the child VMs is inefficient, and limited to merely virtual desktops and development labs due to performance problems. For example, the present use of copy-on-write files to maintain differences between a master copy and a linked clone (baseline/child relationship) provide storage and access problems. The copy-on-write files can become large quickly, and are cumbersome to manage as they have to be refreshed periodically. Further, a process used to link the master to the clones is very slow and creates storage efficiency problems.

SUMMARY

This disclosure relates to techniques and systems that provide for redeploying a baseline virtual machine (BVM) to one or more child virtual machines (CVMs). The BVM can be a version of a virtual machine that was used to create a plurality of clones, comprising the CVMs, which were deployed on a controller or over a distributed data storage and management system (cluster). As an example, a client machine can be connected to the controller or cluster, and emulate one or more of the deployed CVMs.

The one or more techniques and/or systems, described herein, allow for rapid and efficient redeployment of the BVM to the CVMs, using fewer (storage) resources and performing the deployment faster that current techniques and systems, by creating copies or clones of the BVM's virtual drives in a temporary directory, cloning the virtual drives, and moving them into the CVM's directory. That is, virtual drives for the CVMs are swapped out or replaced with virtual drives of the BVMs (e.g. "re-baselining" the CVM, or deploying a new iteration of the BVM). By merely cloning virtual drives, the CVM's drives can be replaced (e.g., by original baselines or new versions comprising updated programs) in an efficient manner. For example, current and previous techniques and/or systems do not provide for cloning the virtual drives separately from the VM. These current/previous techniques typically clone an entire VM a desired number of times for redeployment and discard those components that are not needed for the redeployment. It can be appreciated that cloning (and then immediately discarding) unnecessary components of a VM is a less than optimal technique. Further, when redeploying entire VMs, instead of merely the virtual drives, one or more failures may occur during cloning/copying that leave the VMs is an unknown state, such as possibly incomplete and/or corrupt.

In one embodiment of redeploying a BVM to one or more CVMs, one or more CVMs are identified that are associated with a selected BVM (selected for redeployment), where the CVM identification is done using metadata that identifies the BVM from which the CVM was cloned. The selected BVM (source BVM) is redeployed to the one or more CVMs that were identified as being associated with the BVM, for example, and were selected as target CVMs (e.g., those targeted by a user or automated program to receive a replacement virtual drive) to receive the redeployment.

In this embodiment, redeploying the BVM to the CVMs comprises gathering virtual drive information for the source BVM and for a target CVM, where the gathered information comprises a datastore location for the target CVM. Further, a temporary directory is created in the datastore that comprises the target CVM, and one or more replacement virtual drives (RVDs) are created in the temporary directory, where the RVD is a clone of a source virtual drive. The one or more RVDs are moved from the temporary directory to a directory of the target CVM, which replaces an existing CVM virtual drive.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
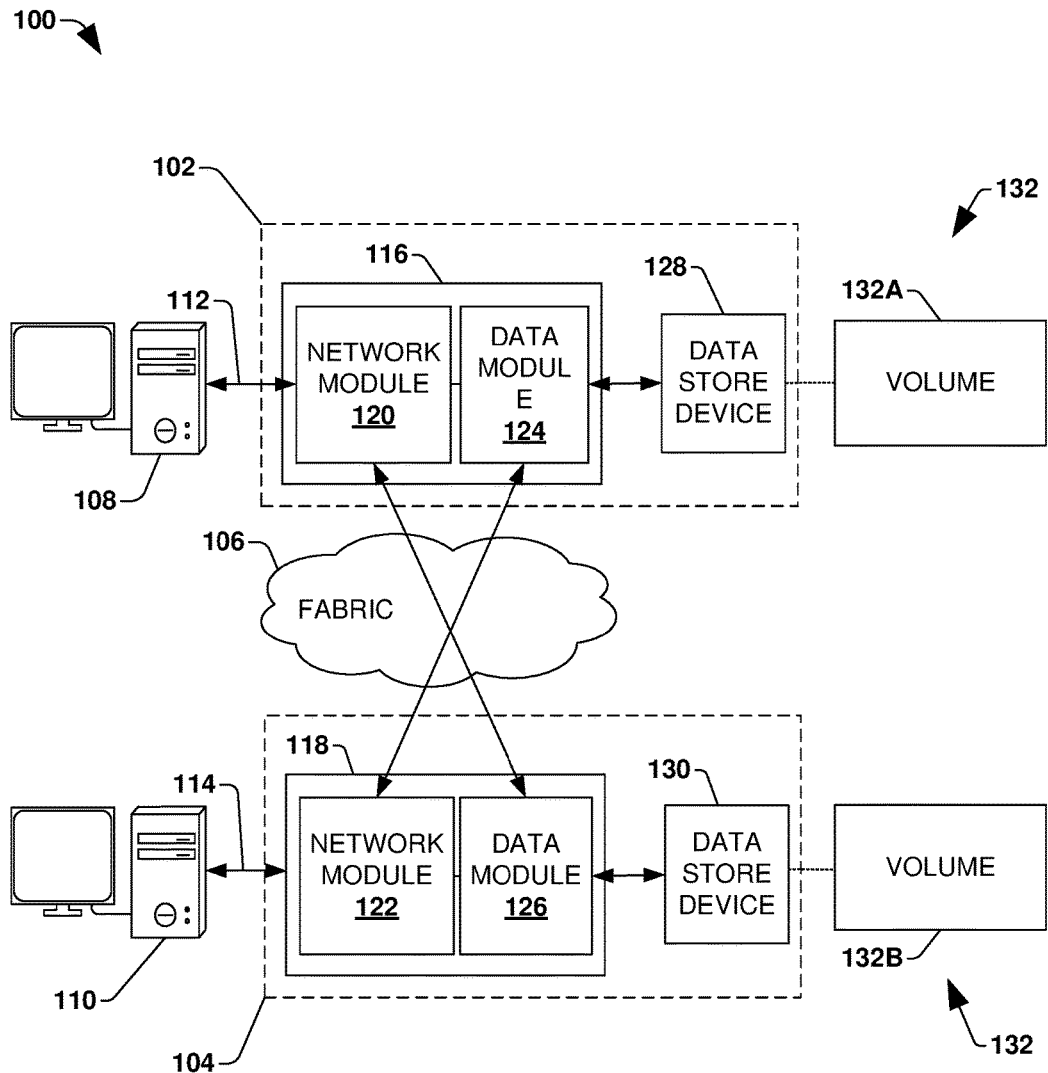
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a multi-node, clustered data storage and management network, data can be stored in a plurality of nodes and distributed clients can be connected to the network via one of the plurality of nodes (e.g., comprising storage controllers). One or more virtual machines (VMs) can be instantiated and cloned on a controller or throughout the cluster. Further, a preferred version of a VM (a baseline VM) can be cloned a plurality of times, and the plurality of clones (child VMs) can be deployed on the controller or throughout the cluster. Periodically, it may be desirable to redeploy the baseline VM to the child VMs, such as for security or to create clean versions of the baseline.

Figure 2:
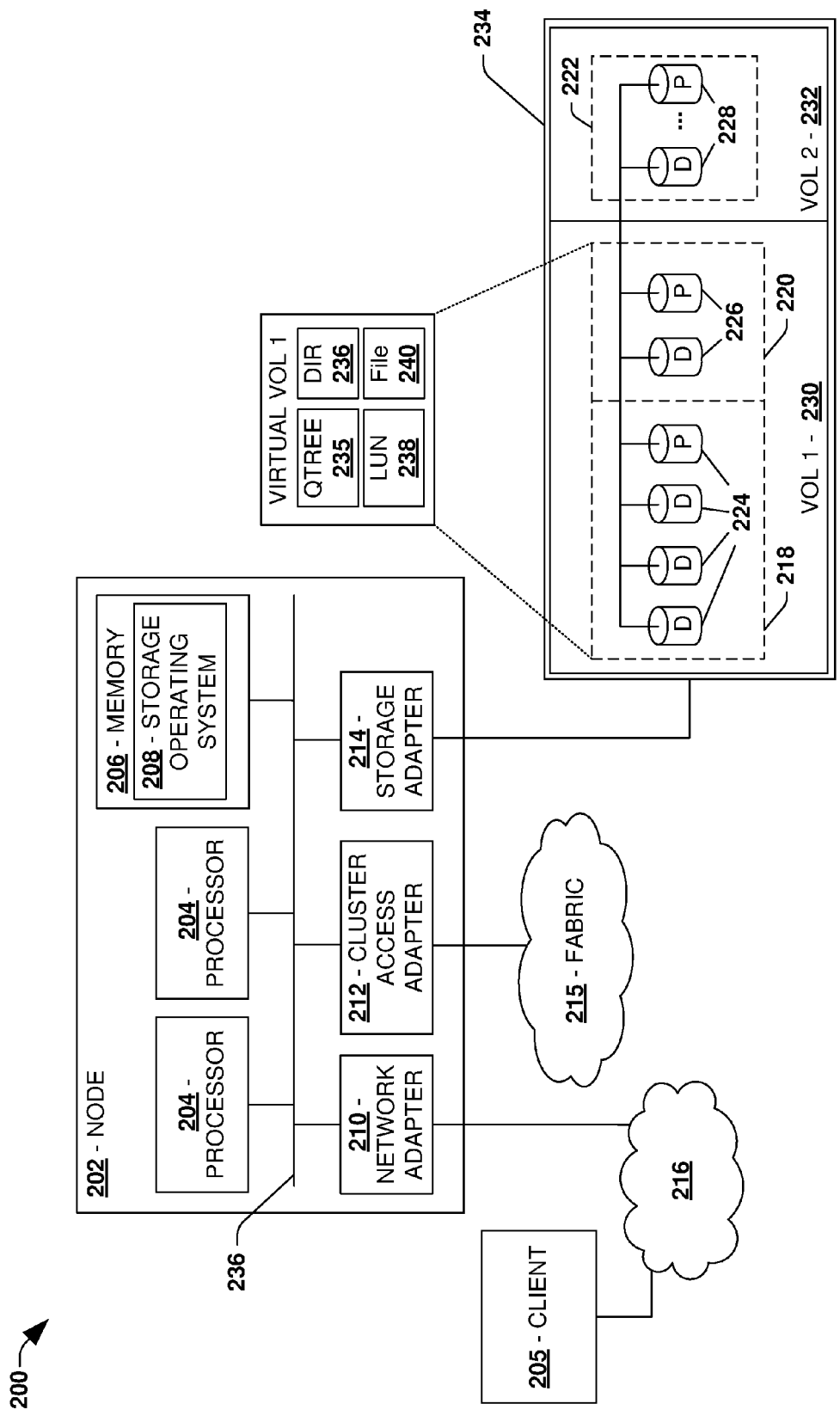
FIG. 2 is a component block diagram illustrating an example data storage system in accordance with one or more of the provisions set forth herein.

To provide a context for an embodiment of redeploying a baseline virtual machine to one or more children virtual machines, such as from a distributed data storage environment, FIG. 1 illustrates a clustered network environment 100, for example, whereon clients connect to a plurality of distributed nodes, and FIG. 2 illustrates an embodiment of a data storage system that may be implemented to store and manage data in this clustered network environment, including virtual machine information. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the network module 120 in the node 116 within data storage system 102.

The node 116 can forward the data to the data storage device 128 using the data module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

In one embodiment, as illustrated by the example environment 100 of FIG. 1, when a baseline VM is to be redeployed to child VMs, for example, where data comprising the baseline VM is stored in the volume 132A, and the child VMs are disposed on volume 132B, a repository can be created in a datastore on the volume 132B in which clones of a source BVM, from the volume 132A can be created. The clones of the source BVM can then be moved into a directory for the CVMs in the datastore on the volume 132B, for example.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to identify child virtual machines to be redeployed to, and to perform the redeployment of the baseline VM.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 224, 226 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 224 by using one or more addresses that identify the LUNs 238.

Figure 3:
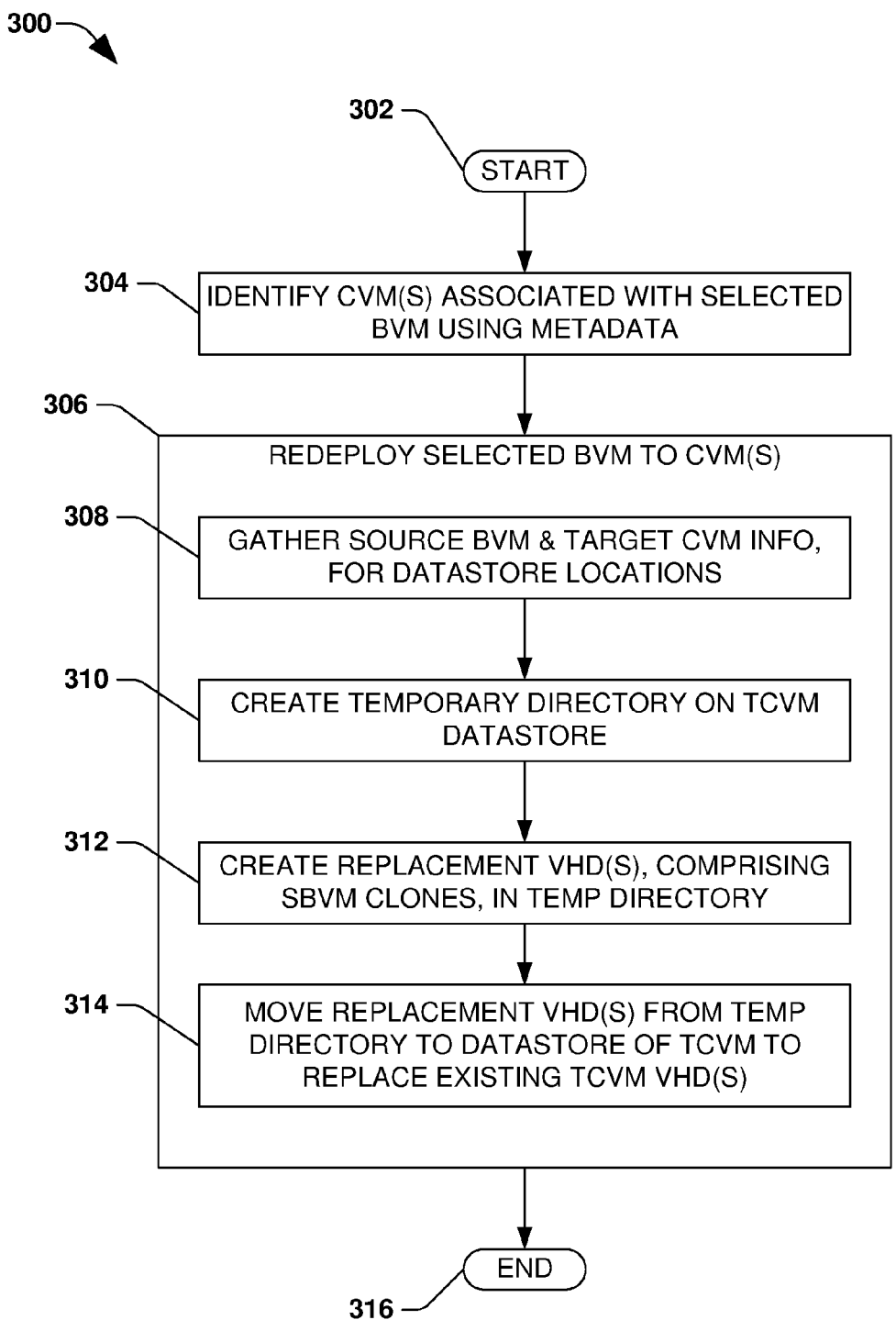
FIG. 3 is a flow diagram illustrating an example method for redeploying a baseline virtual machine to one or more children virtual machines in accordance with one or more of the provisions set forth herein.

FIG. 3 is a flow diagram illustrating an example method 300 for redeploying a baseline virtual machine to one or more children virtual machines. In this embodiment, merely virtual drives from a baseline virtual machine are cloned in a temporary directory, and the clones drives are moved into one or more child virtual machines (e.g., children of the parent baseline VM). It will be appreciated that using the temporary directory allows the virtual drives to be cloned separately and also allows cloning to be expedited by using data-container level cloning techniques (e.g., file-level cloning), instead of native cloning/copying of the virtual drives, where native cloning can require using (substantially unique) code, for example, that may be specifically written for particular drives and/or VMs, for example. Further, the cloned drives can be moved in a single (atomic) operation, for example, from the temporary directory to the child virtual machines. In this way, in this example, the move operation either works or does not, and does not leave the child VMs in an unknown state, such as may happen with current and/or previous techniques wherein entire VMs are cloned and moved to a new location. That is, because cloning entire VMs requires much more data to be copied than merely cloning virtual drives as provided herein, there is an increased likelihood or opportunity for data to become corrupt and/or incompletely copied. Thus, redeploying baseline VMs as provided herein can be done in a much more efficient and substantially less error prone manner than conventional techniques.

The example method 300 begins at 302 and involves identifying one or more child virtual machines (CVMs) that are associated with a baseline virtual machine (BVM) that has been selected, such as for redeployment, where the CVM identification is done using metadata identifying the BVM that is associated with the CVMs, at 304. That is, in one embodiment, CVMs can have metadata attached to them, such as in a configurations file for a CVM, that identifies the BVM from which they were cloned.

As an example, a virtual machine (VM) may comprise a framework of an operating system, applications and system configurations that can be stored in a distributed data storage system (e.g., 100 of FIG. 1). In this example, the VM can utilize hardware components of a client (e.g., 108, 110 of FIG. 1), such as a processor and local memory, to emulate a computing device, such as a desktop environment. That is, a personal computer (PC) typically comprises its own operating system, applications and system configurations to enable a user to operate the computer.

In this example, the virtual machine can emulate a desktop environment on the PC using the PC's hardware, but utilizing the operating system, applications and system configurations stored for the VM in the distributed data storage system. Further, a plurality of child VMs can be cloned from a baseline VM, and the configurations for the child VM can also be stored in the distributed data storage system. In this way, a plurality of clients can run the child VMs by accessing the stored configurations through the distributed data storage system.

A BVM is an iteration of a virtual machine that is used to create clones, comprising the children. For example, in a computer lab one may wish to create a plurality of identical clones in order to run a series of beta testing for a new component. In this example, a particular virtual machine iteration that is designed to run the tests can be used as a baseline for the child clones. In one embodiment, a rapid cloning utility can be used to take the BVM and clone it a desired number of times. As described above, in this embodiment, metadata can be associated (e.g., attached) with the child clones that identifies from which baseline they were cloned, for example.

In one embodiment, the CVMs may be deployed on a distributed data storage and management system, such as illustrated in FIG. 1. For example, a client (e.g., 108, 110) can be connected to the distributed data storage and management system, and one or more CVMs can be emulated on the client machine, by accessing the CVM data from the distributed data storage and management system. Further, the BVM can be stored on a volume (e.g., 132) of the distributed data storage and management system, from which the CVMs were cloned.

At 306 in the example method 300, the selected BVM is redeployed to the one or more CVMs that were identified as being associated with the BVM (e.g., as cloned children). Redeploying a virtual machine, such as the BVM, can be performed for a variety of reasons. In one embodiment, the BVM can be redeployed to the CVMs in a virtual desktop infrastructure (VDI), where retaining data on the CVM may not be necessary. In another embodiment, the BVM may be redeployed so that patches or application updates can be efficiently rolled out to the CVMs.

One example of redeployment use in a VDI is in a kiosk-type environment, where a terminal is merely utilized for a limited period to perform transactions or other operations. For example, in an educational environment, where a group of CVMs have been used for a period of time, such as in a teaching computer lab, the BVM can be redeployed to create a clean version of the baseline when a new lab session begins, thereby removing any changes made by prior students (e.g., answers give to a previously administered test that is now being given to another group of students). As another kiosk-type example, CVMs may be used in libraries, internet cafes, airport terminals, even informational kiosks. In this example, the CVM can be cleaned after respective use (or periodically as required) by redeploying the BVM (e.g., so that a prior user's data, search query, search string, search history, user name, password, etc. is not available to a subsequent user).

As another example of use in VDI, often, for security purposes, a BVM may be redeployed when a new session begins on a terminal at an enterprise, such as a financial institution or military operations. In this example, a secure desktop environment is often needed every time a user logs on to the system. In this example, the redeployment of the BVM can be made to the CVM in order to erase any traces of cached information, restoring the CVM to it baseline state. In the secure desktop environment, the redeployment can destroy the prior version of the CVM, for example, thereby mitigating a possibility that a subsequent user may find information from a prior session.

As an example of redeployment for rolling out updates to the CVMs, a new service pack, new files, and/or new software may be loaded on to the BVM. Here, because the user of the CVM do not have their data stored locally (e.g., on CVM disks or local memory), the BVM can be redeployed to the CVMs to roll out the updates quickly and efficiently to the respective CVMs. In this way, in this example, when a user logs back in to the CVM their personalized data is still available from a share in the distributed data system, for example, but their CVM has been updated with new files and/or software.

In the example method 300, at 308, redeploying the BVM to the CVMs comprises gathering virtual drive information for a source BVM (SBVM), comprising the selected BVM, and for a target CVM (TCVM) comprising a selected CVM (e.g., one that is selected/targeted for receiving a deployed replacement virtual drive), where the gathered information comprises a datastore location for the CVM. For example, the distributed data storage system can comprise a plurality of data storage volumes (e.g., 132 of FIG. 1, 230, 232 of FIG. 2), as described above, which may comprise data distributed over a plurality of data storage devices (e.g., 128, 130 of FIG. 1, 234 of FIG. 2), respectively comprising a plurality of data storage components, such as disks (e.g., 224, 226, 228 of FIG. 2), found in structured arrays (e.g., 218, 220, 222 of FIG. 2) in the storage device.

In one embodiment, a datastore can be a type of database that organizes data in a desired structure to enable access (e.g., read/write) according to its particular use. Datastores can be comprised of a directory structure (e.g., a directory, such as 236 of FIG. 2, or a Qtree, such as 235 of FIG. 2) and data (e.g., LUNs, such as 238 of FIG. 2, and/or files, such as 240 of FIG. 2) that are stored in a volume on the distributed data storage system. In one embodiment, a datastore can be used for storing a virtual machine, such as the BVM and CVMs, and they can be created for such a purpose or an existing datastore may used for this purpose.

In the example method 300, the location of the datastore that comprises the CVM is identified, for example, thereby identifying a volume in the distributed data storage system on which the datastore resides (e.g., a virtual volume where directory structures and data for the datastore are organized). In one embodiment, identifying the volume on which the datastore resides can affect how the BVM is redeployed, such as if the volume comprising the CVM resides on a different node in the cluster.

At 310 in the example method 300, redeploying the selected BVM to the CVM comprises creating a temporary directory on the datastore that comprises the TCVM. In one embodiment, the temporary directory is a repository for temporarily storing information that comprises the virtual drives to be redeployed to the CVMs. For example, the SBVM comprises virtual drives, as described above, which can be comprised of storage locations distributed over the distributed data storage system and organized on virtual volumes. In one embodiment, the temporary directory (repository) can be used to store information (e.g., a pointer) that identifies a location of a SBVM virtual drive.

At 312, one or more replacement virtual drives (RVDs) are created for the TCVM in the temporary directory, where the RVD is a clone of a SBVM virtual drive. For example, if a SBVM comprises one virtual drive, one RVD is created for the TCVM in the repository. Further, if the SBVM comprises more than one virtual drive, a number of RVDs can be created in the repository that corresponds to the number of SVBM virtual drives. In this example, the respective RVD created are clones on the respective corresponding SVBM virtual drives.

A RVD can be created in the temporary directory in a variety of ways, and the techniques and/or systems, described herein, are not limited to any particular embodiment. In one embodiment, the creation of the RVD may depend on how the SVBM and TCVM are situated with respect to each other. That is, illustrating some examples, the SVBM and TCVM may reside in a same datastore, they may reside on different volumes of a same controller, they may reside on different controllers, and they may even reside on different and/or incompatible controllers.

In one embodiment, prior to creating the RVDs in a repository, for example, a location of the SBVM and TCVM can be determined in order to determine how the creation of the RVDs may be undertaken. In this embodiment, for example, a desirably (e.g., most) efficient, available copy/cloning mechanism can be used to create the RVD in the repository of the datastore. As an example of available copy/cloning mechanisms, a native virtual machine clone feature can be used where the feature is native to the location of the SBVM, such as where the source and target may reside on different controllers that are not of a same type (e.g., not compatible as they are from different manufacturers, and/or utilize different operating systems/utilities, etc.).

As another example, an available copy mechanism may merely comprise a regular data copy, where data is copied. In another example, data-container (e.g., file, block of data, LUN, etc.) cloning, such as file level cloning of data can be used, such as when the source and target reside on same volume of the distributed data storage system. Another example may comprise a sparse-aware copying, where merely sections of the source virtual drive that contain data are copying to the RVD, and not sections that are empty (e.g., have zeros stored). In this embodiment, a clone/copy mechanism that provides a desirable (e.g., most) efficient creation of the RVD in the repository, for example, can be chosen for the circumstance of the disposition of the source and target relative to each other.

At 314 in the example method 300, the one or more RVDs are moved from the temporary directory (e.g., repository) to a TCVM directory, replacing existing CVM virtual drives (VDs) in the datastore. In one embodiment, once the repository is full (e.g., has been populated with enough RVDs from the SBVM for each of the TCVMs in the datastore) the RVDs are moved to the TCVM directories, for example, by replacing the existing virtual drives (e.g., data in the directory that identifies locations of the drives) with pointers to the RVDs (e.g., comprising the SBVM virtual drives).

In this embodiment, where the RVDs replace existing VD for the CVMs, the BVM drives have been redeployed to the CVMs, for example. In this way, for example, any patches, software updates, and/or configurations can be rolled out to the CVMs, as the virtual drives have been replaced with clones of the BVM. Having, redeployed the selected BVM to the one or more CVMs, the example method 300 ends at 316.

Figure 4:
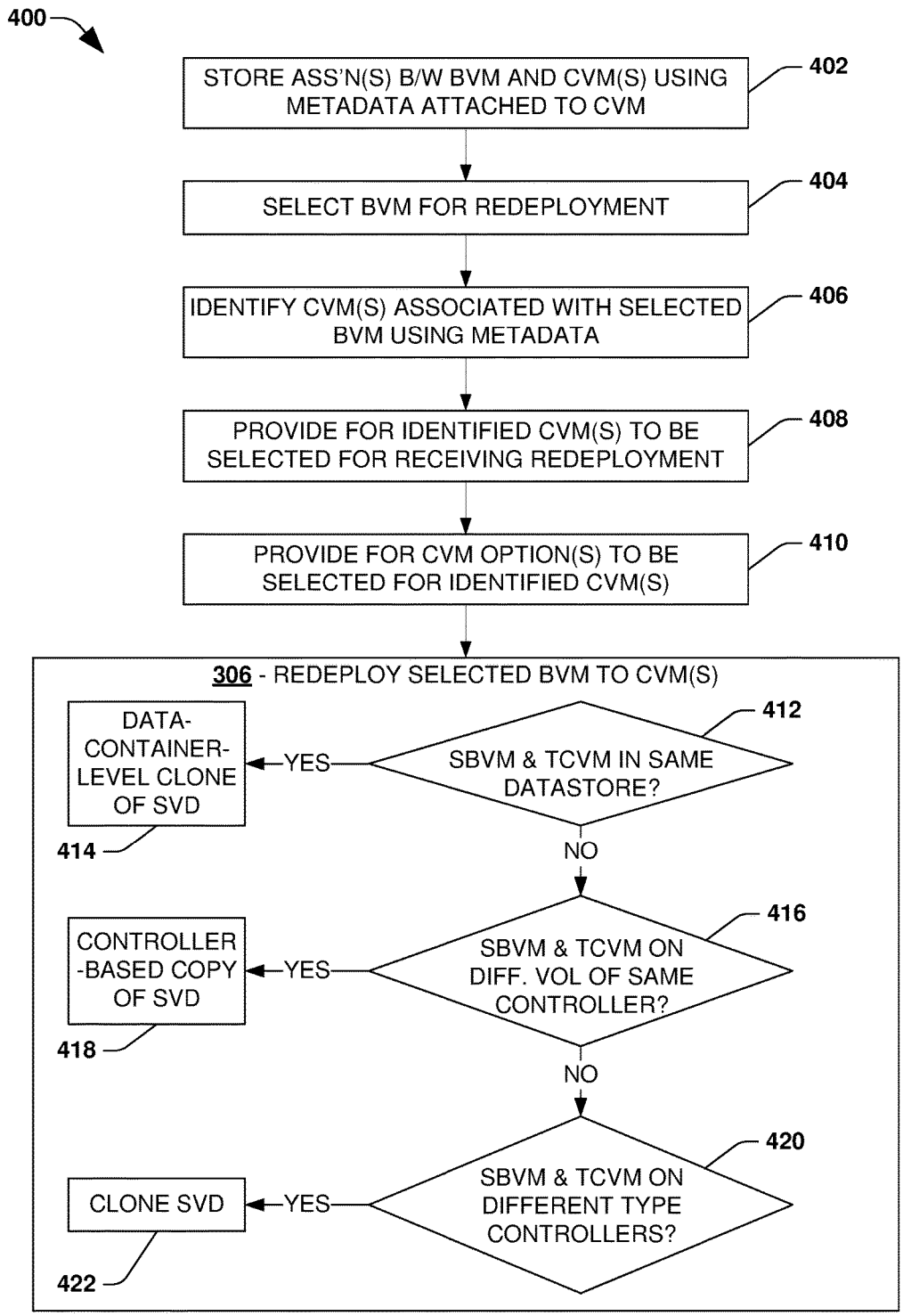
FIG. 4 is a flow diagram of one embodiment of an implementation of one or more techniques described herein.

FIG. 4 is a flow diagram of one embodiment 400 of an implantation of one or more of the techniques described herein. In this embodiment 400, at 402, an association between a baseline virtual machine (BVM) and a child virtual machine (CVM) can be stored by attaching metadata to the CVM. For example, when a CVM is created, the metadata can be attached to the CVM that identifies the BVM from which it was cloned. Further, the metadata may identify a domain to which the CVM is deployed, such as a domain in the distributed data storage system comprising a virtual volume. Additionally, the metadata can identify a date that it was deployed to the domain. In this way, for example, the metadata may help identify desired CVMs for redeployment, such as by BVM, domain and date.

At 404, Provisions can be made that allow for selecting a BVM for use in the redeployment, such as from a list of BVMs. For example, a BVM can comprise a snapshot of a virtual machine (VM) configuration at a particular time, such as when the VM had a desired configuration (e.g., desirable to a user or administrator for a particular use). Further, a BVM may comprise a template VM, for example, which is a non-deployed version of a VM that is configured in a particular way, such as for use in a teaching lab. Additionally, the BVM may comprise a VM currently in use. Therefore, for example, the list of BVMs may comprise a plurality of snapshots, templates and/or VMs from which a BVM can be chosen.

At 406, one or more CVMs can be identified for a selected BVM using the metadata that associates the CVMs to the BVM. That is, for example, a database of CVMs can be maintained, where the database identifies from which BVM the respective CVMs were deployed, using the metadata. In this example, the selected BVM can be compared against the database (e.g., a lookup) to identify which CVMs are associated with the selected BVM (e.g., were deployed from the BVM).

At 408, a provision can be made that allows one or more of the identified CVMs (e.g., associated with the BVM) to be selected for receiving the redeployment of the BVM. As an example, an administrator or user may wish to redeploy a BVM to one or more of its CVMs. In one embodiment, a user interface can be provided that allows the user to select which BVM to redeploy and to select which of the CVMs for that BVM to direct the redeployment.

In another embodiment, the selection of a BVM and/or selection of the CVMs may be performed automatically, such as programmatically. That is, for example, a timer may be set up in a program that automatically redeploys selected BVMs to selected CVMs periodically. As another example, redeployment may be programmatically set to occur when a particular threshold for changes to a BVM occurs, such as added patches, updates, etc. As another example, a redeployment may be programmatically set to occur when a CVM becomes corrupted, and/or a particular type of error occurs.

At 410 in the example embodiment 400, one or more CVM options can be provided for selection, for the identified CVMs, prior to redeployment. In one embodiment, an option can comprise maintaining a current configuration of the CVM. Further, an option may comprise customizing CPU use, memory configuration, and other configurations as described above for virtual machines. Another example of a CVM option may comprise a power-state of the CVM, such as powered on or off. In one embodiment, the user interface described above may be utilized by a user to select options for the respective CVMs. In another embodiment, the options may be selected automatically (e.g., programmatically) based on circumstances for the redeployment.

The selected BVM can be redeployed to the one or more selected CVMs, at 306, as described in FIG. 3 above, where, prior to redeployment a location of the source BVM and target CVM(s) can be identified, as described above. In this example embodiment 400, if the SBVM and TCVM are disposed in the same datastore, at 412, the one or more source virtual drives (virtual drives from the source baseline virtual machine) can be cloned to temporary directory of the datastore using a data container level cloning mechanism, such as a file level or block-level cloning mechanism, at 414. For example, a virtual snapshot file of the source VD can be created in the repository of the datastore from the TCVM.

If the SBVM and TCVM are not in the same datastore, and are on different volumes of a same controller, or the SBVM and TCVM are on different controllers that are of a same type (e.g., compatible, or of a same manufacture), at 416, a controller-based copy mechanism can be used to create a cloned copy of the SVD in the temporary directory of the datastore, at 418. For example, where the cloning/copying is performed between compatible volumes (e.g., either in a same controller or different compatible controllers) the source VD can be copied directly to the repository using the controller's native copy mechanism.

At 420, if the SBVM and TCVM are on different controllers that are of a different type (e.g., not compatible, not of a same manufacture) a virtual clone of the source VD can be created in the temporary directory of the datastore using virtual machine clone mechanism. For example, a virtual machine clone can be created of the SBVM, such as by using a VM cloning mechanism native to the source controller, and the VM clone can be moved to the repository of the database. In this example, the virtual drive portion of the VM clone can then be retained in the repository and remaining portions of the VM clone discarded. In this way, in this example, merely the source virtual drive remains in the repository of the datastore for the CVM.

Figure 5:
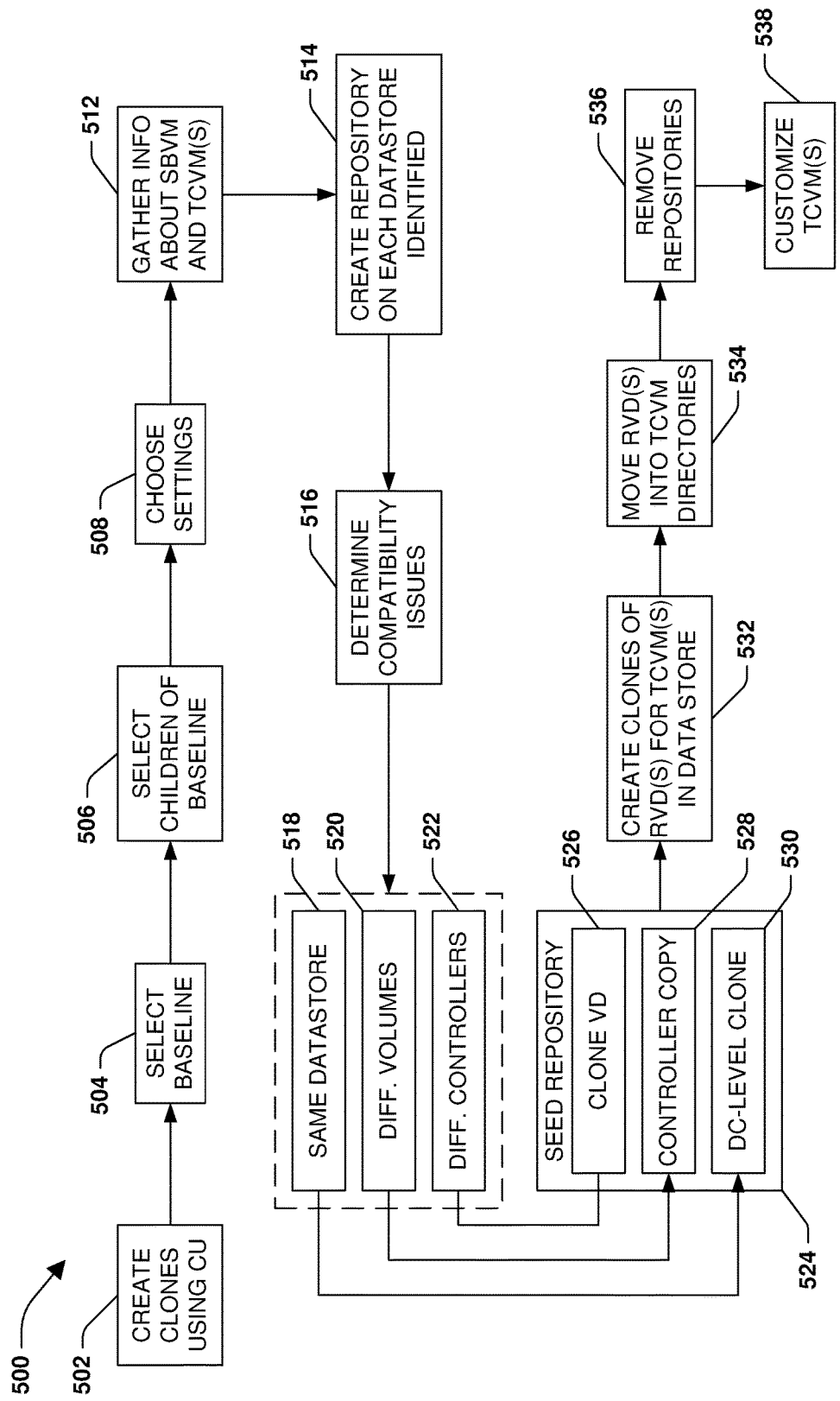
FIG. 5 is a flow diagram illustrating another example embodiment of an implementation of one or more techniques described herein.

FIG. 5 is a flow diagram illustrating another example embodiment 500 of an implementation of one or more of the techniques described herein. At 502, an optional act occurs where a plurality of child clones can (optionally) be created of a baseline virtual machine, and deployed on distributed data storage and management system (cluster). As described above, a virtual machine (VM) can emulate an actual computing device (e.g., a desktop environment), and the child virtual machines (CVMs), for example, can emulate the virtual machine desktop environment on one or more clients connected to the cluster. Further, as described above, the data comprising the CVMs, which provides the emulations, can be stored in the cluster.

At 504, when preparing for a VM redeployment, a baseline virtual machine (BVM) is selected as a source for the redeployment, such as from a list of a plurality of BVMs. At 506, one or more CVMs that are associated with the BVM can be selected (e.g., either manually or automatically) as target CVMs for the redeployment. As an illustrative example, in FIG. 6A, a BVM 602 may comprise virtual disks that have updates 606, such as new software patches/updates, new applications, or new data, that a user wishes to roll out to a plurality of CVMs 604A-C.

Figure 6:
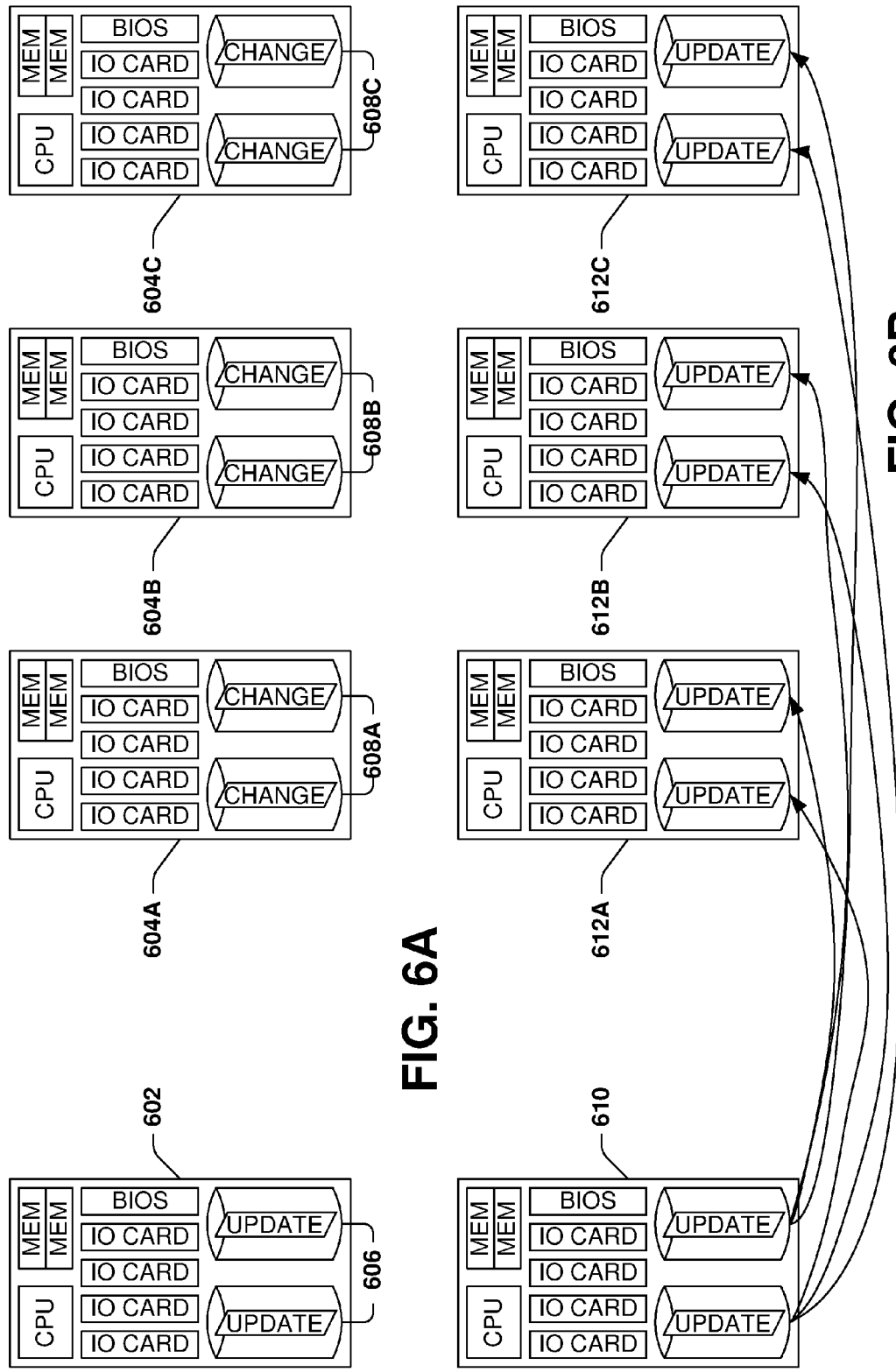
FIGS. 6A-B are component diagrams illustrating example embodiments in accordance with one or more of the provisions set forth herein.

As another example, the CVMs 604A-C may have virtual drives 608A-C that have been changed by users during their use, where each of the CVMs virtual drives 608A-C comprises different data than that of the BVM's virtual drives 606. In this example, the user may wish to redeploy a baseline version of the BVM's drives 606 to the respective CVMs 604A-C, in order to bring them to a baseline state. As illustrated in FIG. 6B, the redeployment provides for the changed drives of the CVMs 612A-C to be replaced by the virtual drives from the BVM 610, for example, to roll out updates or refresh the CVM virtual drives.

In one embodiment, prior to redeployment, the one or more target CVMs can be powered off in preparation for the redeployment. As an example, the powering off may be performed manually (e.g., using a UI) or automatically (e.g., programmatically) as part of a predefined operation. In one embodiment, when preparing for the redeployment, the powering off of the CVM(s) may comprise requesting that a TCVM be powered off. That is, for example, a user may use the UI to identify TCVMs that are powered on and send a request over the cluster to shut down the TCVM. The request may be sent to a user to manually shut down the TCVM or to an operation that can programmatically shut down the TCVM, for example. In one embodiment, if the TCVM has been moved to an incompatible controller (e.g., one that does not support the redeployment due to versioning or other reasons), such as subsequent to the initial deployment and prior to the current redeployment, this TCVM may be ignored for the redeployment.

At 508, settings for the TCVMs can be chosen. As described above, a virtual machine may be customized for specific uses, such as a teaching lab setting, a secure virtual desktop, or other desired settings for the CPU, memory, storage, etc. Further, a customized power setting can be chosen, such as powering the TCVM up after the redeployment.

At 512, information about the SBVM and TCVM(s) is gathered, such as a datastore location, for example, from the host (e.g., hypervisor). As an illustrative example, a virtual machine directory 706 for the SBVM can be located in datastore A 702, and the virtual machine directories for the TCVMs 710 can be located in datastore B 704. As described above, the SBVM and TCVM directories may be located in a same data store, or the datastores may be located on different controllers. Further, as described above, a location of the respective datastores can affect how a replacement virtual drive (RVD) is created.

In one embodiment, the respective one or more source virtual drives, which will become replacement virtual drives (RVDs), can be interrogated in order to determine whether partitions in a partition table for the VDs are configured to allow a file system of the datastore comprising the TCVM to align with the controller comprising the SBVM. That is, a VD can comprise partitions (storage partitions for a drive), for which information is stored in a partition table, such as in the VD. The partition table can be reviewed to determine if the file system of the VD is compatible with the file system of the datastore to which the RVDs will be cloned/copied. If they are not compatible, for example, the VD can be ignored, or can be updated to a compatible partition file format.

At 514, a repository (temporary directory) is created in respective datastores that comprise the TCVMs, as described above. As an example, the repository can be created by the controller comprising the SBVM, such as using a component disposed in the controller. In one example, such a component may be part of a network module (e.g., 120, 122 of FIG. 1) or data module (e.g., 124, 126 of FIG. 1) disposed in a node (e.g., 116, 118 of FIG. 1) of the cluster (e.g., 100 of FIG. 1). In the illustrative example of FIG. 7, three TCVM directories 710 are disposed in the datastore B 704, therefore, a repository 708 is created in datastore B 704 for the three TCVMs. As an example, if a TCVM is disposed in second datastore a repository is also created in the second datastore for the TCVM.

Figure 7:
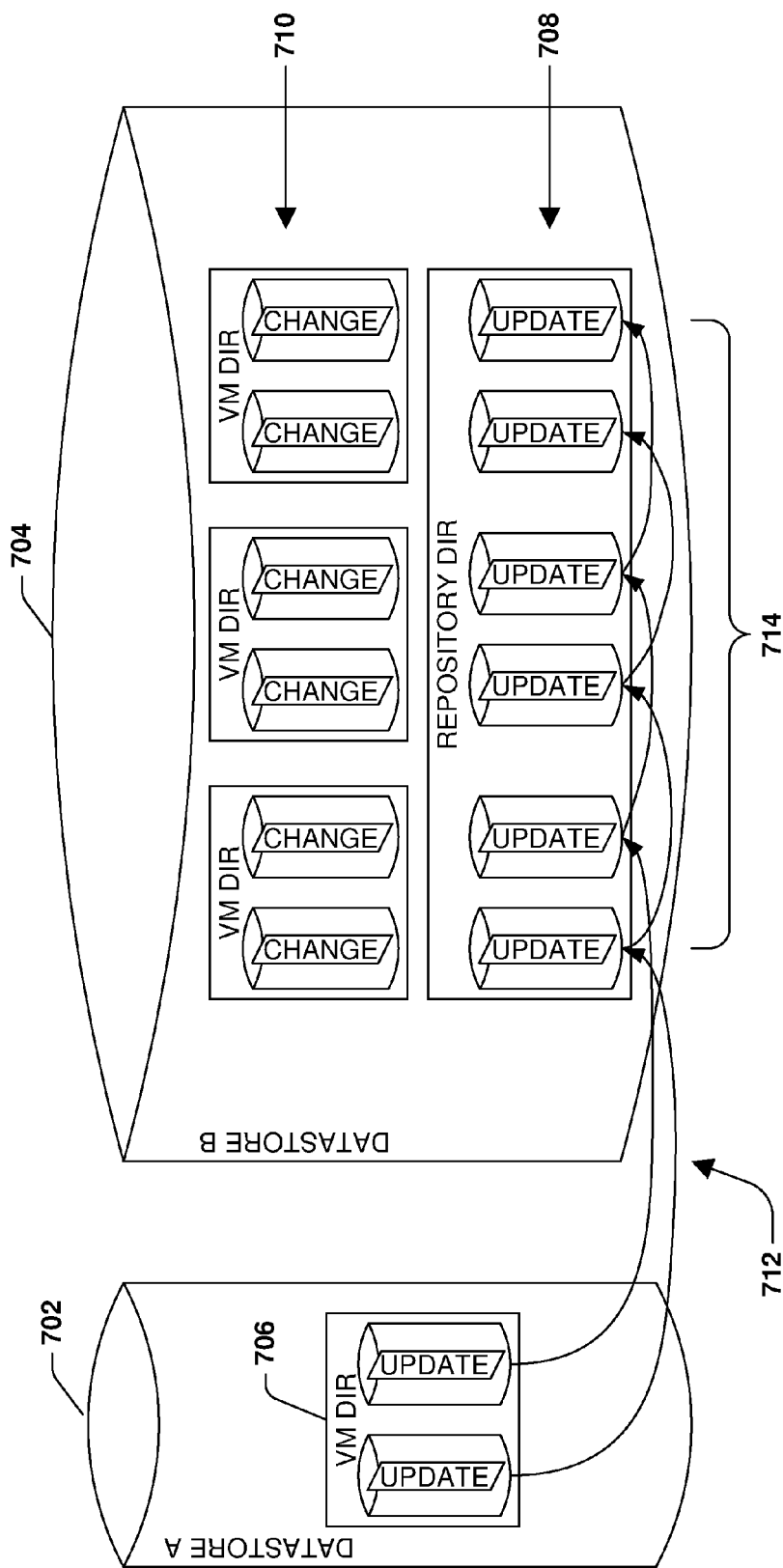
FIGS. 7-8 are component diagrams illustrating example embodiments in accordance with one or more of the provisions set forth herein.

In one embodiment, the repository in the datastore (e.g., 708 in 704 of FIG. 7) can be seeded with a clone/copy of the SBVM virtual drive (or a plurality of clones of the plurality of virtual drives from the SBVM), such as the virtual drives in the SBVM directory 706 of FIG. 7. That is, as illustrated in FIG. 7, a first clone/copy (e.g., a seed version) of the SBVM virtual drive(s) can be copied or cloned 712 to the datastore's repository. In this embodiment, where there is more than one TCVM directory 710 in the datastore 704, the first clone/copy can be further cloned 714 (e.g., creating second clone(s)) in the repository so that a number of RVDs (e.g., first clone plus respective second clones) corresponds to a number of TCVMs in the datastore, for example.

In one embodiment, the seeding of the repository comprises offloading the cloning of the RVDs to a separate storage controller. That is, for example, the repository is disposed in a volume of a storage controller, which can separately perform the cloning of a plurality of RVDs to be later redeployed to the TCVMs. In this way, in this example, the cloning/copying of the RVDs separately can provide for more efficient use of resources and a faster redeployment.

In one embodiment, for example, where the SBVM and TCVM(s) are located in different volumes or controllers, the seeding of the repository followed by a file/block level cloning of the first clone can provide a faster redeployment. In this example, the first cloning may comprise a native copy or a virtual machine cloning for the source VDs, which typically takes longer than a file/block level cloning. Therefore, in this embodiment, merely one first cloning occurs, which can take longer to execute, instead of performing this first type of cloning for each of the TCVMs.

In one embodiment, an efficient available host-based copy mechanism, as described above, to create a clone of the SVD in the repository of the datastore (e.g., as an RVD), can be used where the SBVM is powered on. Further, an efficient available host-based copy mechanism can be used where the SBVM has at least one virtual machine snapshot. Additionally, the efficient available host-based copy mechanism can be used where the SBVM is a specific virtual machine snapshot of the virtual machine. In this example, the first cloning may comprise a host-based copy for the source VDs, which typically takes longer than a file/block level cloning. Therefore, in this embodiment, merely one first cloning occurs, which can take longer to execute, instead of performing this first type of cloning for each of the TCVMs.

At 516 in the example embodiment 500, in order to determine what type of seeding of the repository can be performed, for example, a location of the SBVM and TCVM with respect to each other is used to determine compatibility issues. At 518, if the SBVM and TCVM(s) are in the same datastore, the repository can be seeded, at 524, using a data-container level (e.g., file-level or block-level) cloning technique for a first clone(s) of the source VD(s), at 530. At 520, if the SBVM and TCVM(s) are in different volumes, or different compatible controllers, as described above, a controller-based copy can be performed, at 528, to seed the repository with a first clone(s) of the source VD(s). At 522, if the SBVM and TCVM(s) are in different controllers that are incompatible, at 526, the source VD(s) can be cloned to seed the repository, for example, by performing a virtual machine clone of the SBVM and keeping merely the source VD, as described above.

At 532, where there are more than one TCVMs in the datastore, as illustrated by 710 of FIG. 7, one or more second clones of the first clone/copy of the source VD (which is a replacement virtual drive) can be created in the repository of the datastore for the respective TCVMs (e.g., file level cloning, such as 714 of FIG. 7). It will be appreciated that this is a controller based action. In this way, as described above, the repository can be filled with RVDs more efficiently (e.g., faster and using only a fraction of the capacity typically required), particularly if the initial seeding of the repository uses a mechanism that takes longer than a data-container level cloning technique (e.g., file-level or block-level cloning), for example.

Figure 8:
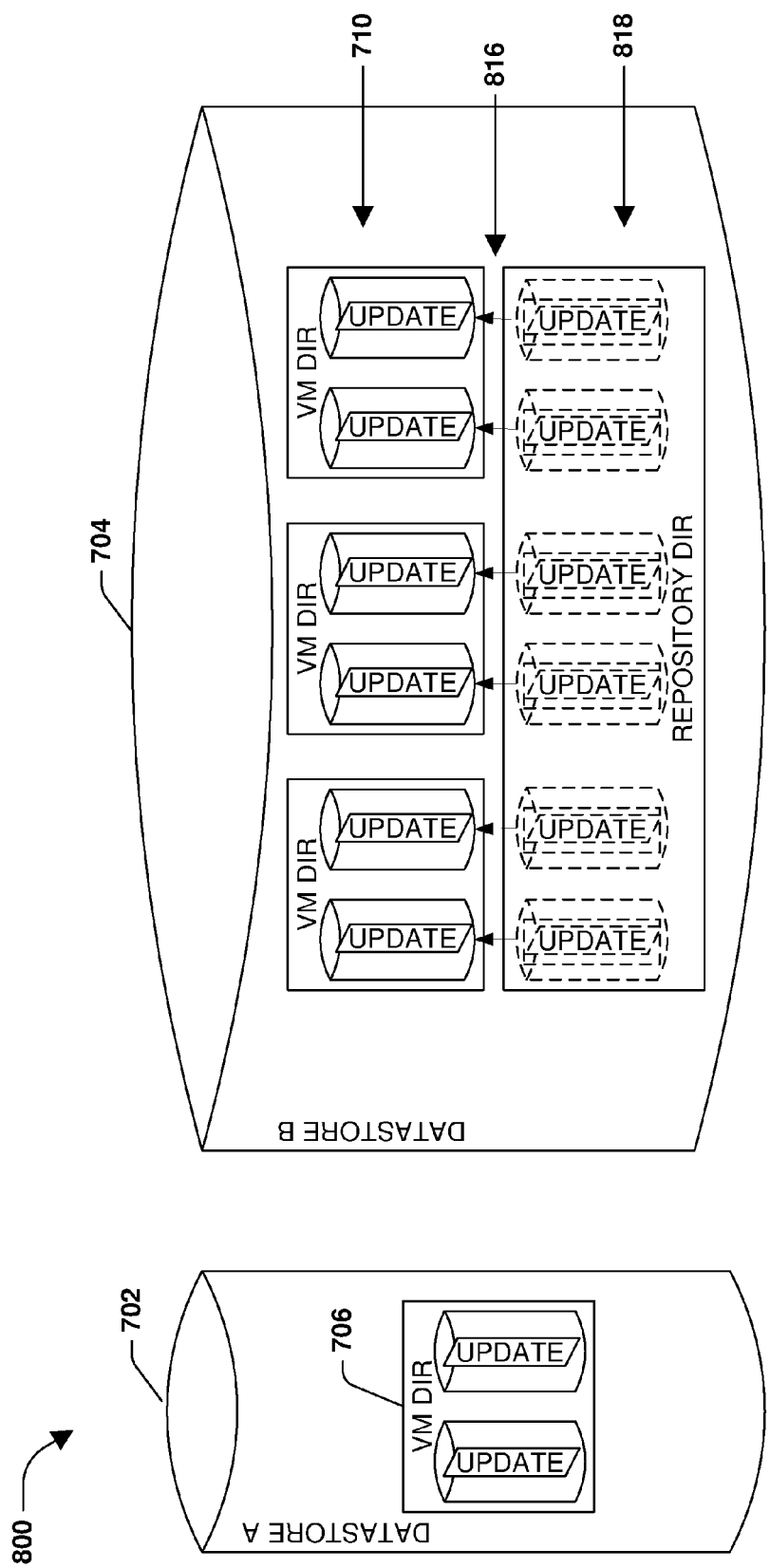

At 534, and as illustrated in FIG. 8, the RVD(s) can be moved 816 from the directory of the repository into the directory of the TCVMs 710. As an example, moving the RVDs can be performed by changing a pointer in the directory of the TCVM so that it points to the RVD instead of an existing virtual drive for the TCVM. At 536, the repository directories can be removed from the datastore, such as shown in FIG. 8 where the repositories are removed 818 from the datastore B 704.

At 538, after the one or more RVDs are in the TCVM, the TCVM can be customized. In one embodiment, a guest customization may be applied to the TCVM, such as a configuration for a particular user or use. In one embodiment, the TCVM may be powered on after the RVD(s) have been redeployed to the TCVM.

A system may be devised for redeploying a baseline virtual machine (BVM) to one or more children virtual machines (CVMs), for example, where CVMs are clones of the BVM. In one embodiment, a plurality of clones can be created of a BVM and deployed on a distributed data storage and management system (e.g., 100 of FIG. 1) (cluster), such that a plurality of clients can emulate a desktop environment using the CVMs, derived from a same baseline virtual machine.

Figure 9:
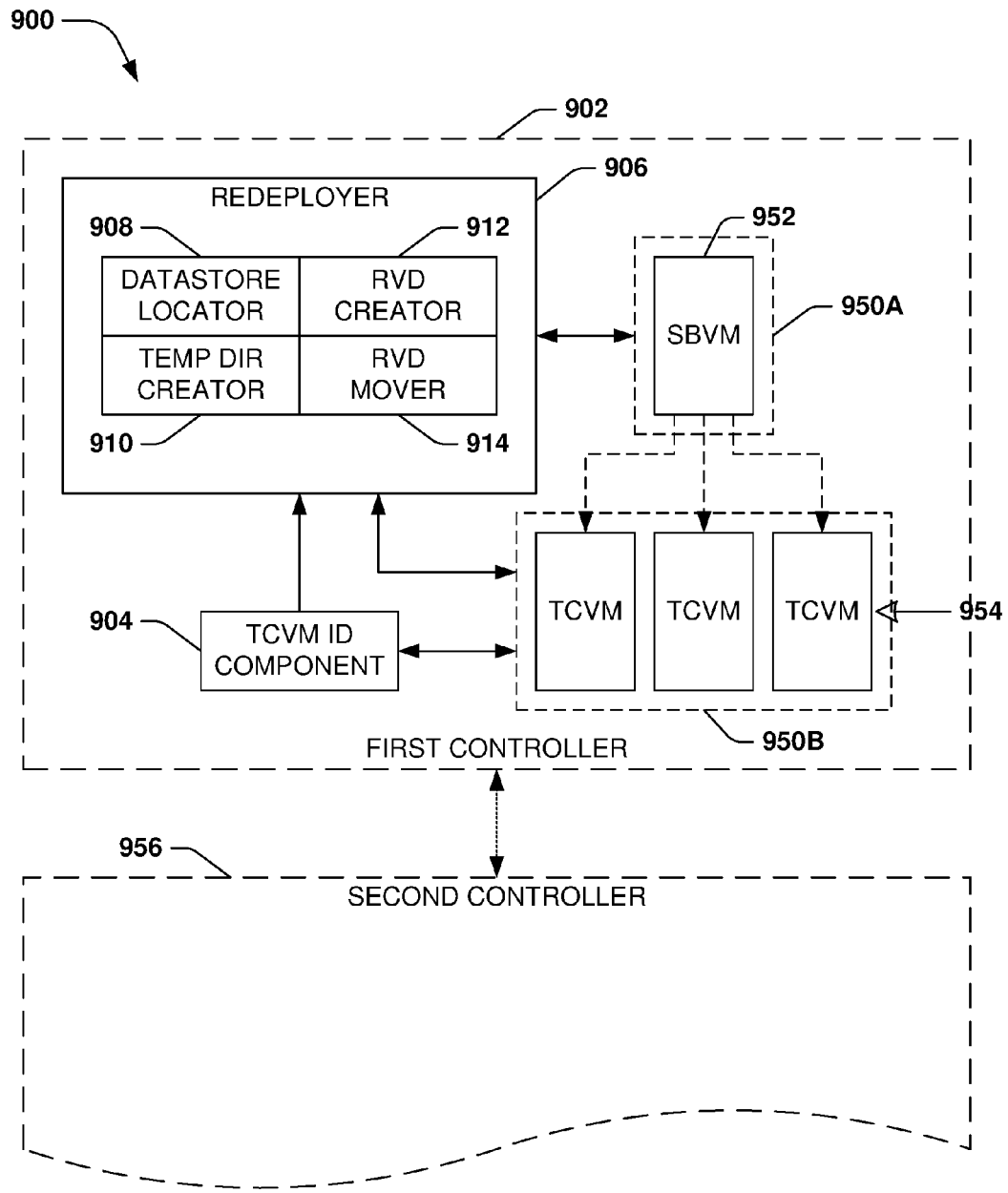
FIG. 9 is a component diagram illustrating an example system for redeploying a baseline VM to one or more child VMs.

FIG. 9 is a component diagram illustrating an example system 900 for redeploying a BVM. A target child virtual machine (TCVM) identification component 904 is disposed in a controller device 902, such as a first controller (e.g., a controller device in a cluster, such as 102, 104 of FIG. 1). In one embodiment, the TCVM identification component 904 may be disposed in one of the components of the controller, such as a network module (e.g., 120, 122 of FIG. 1) or a data-module (e.g., 124, 126 of FIG. 1). In another embodiment, the TCVM identification component 904 may utilize memory and a processor of a node in which it is comprised (e.g., memory 206 and processors 204 of node 202 in FIG. 2)

In the example system 900, the TCVM identification component 904 is configured to identify a TCVM 954 (e.g., a target CVM, that is selected/targeted for receiving a replacement virtual drive from the BVM) associated with a source baseline virtual machine 952 (SBVM) using metadata that is associated with the TCVM 954 that identifies the SBVM 952. For example, when the one or more TCVMs 954 were created, such as by a cloning utility, metadata that identifies the SBVM 952 from which they were cloned can be attached (e.g., as a prefix or suffix attached to the VM data, or in a table that comprises information about respective CVMs) to the TCVMs 954. In this example, the attached metadata can be used by the TCVM identification component 904 to identify the one or more CVMs for the SVBM.

In the example system 900, a redeployment component 906 is operably coupled with the TCVM identification component 904, and one or more datastores 950A-B, on one or more controllers 902 (and/or 956, a second controller). The redeployment component 906 is redeploys the SBVM to the TCVM. That is, for example, the redeployment component 906 can redeploy virtual drives from the SBVM (source virtual drives (SVDs)) to a directory in the TCVMs, thereby replacing existing virtual drives in the TCVMs with replacement virtual drives (the SVDs).

The redeployment component 906 comprises a datastore location component 908 that receives virtual drive (VD) information for the SBVM and the TCVM, and determines a datastore location of a source VD, such as 950A, and a datastore location of a target VD, such as 950B, using the received VD information. In one embodiment, the VD database location information can be received by interrogating the respective VMs, and/or by metadata associated with the respective VMs, such as domain location metadata that is attached to a CVM when it is created.

The redeployment component 906 further comprises a temporary directory creation component 910 that creates a temporary directory (e.g., repository) in the datastore 950B in which the TCVM 954 is disposed (e.g., where a directory for the TCVM is located). For example, with reference to FIG. 7, a repository 708 is a directory in which source VDs can be created during the redeployment.

A replacement VD creation component 912 is comprised in the redeployment component 906, and is configured to create one or more replacement virtual drives (RVDs) for the TCVM in the temporary directory, where the RVDs are clones of the source VD. For example, with reference to FIG. 7, the replacement VD creation component 912 creates 712 and 714 clones/copies in the repository directory 708, which are clones/copies from the source VM directory 706.

A RVD moving component 914, disposed in the redeployment component 906, moves the one or more RVDs from the temporary directory to the TCVM datastore. For example, referencing FIG. 8, the RVD moving component 914 moves the RVDs 816 to the directories of the TCVMs 710, such as by updating a pointer in the TCVM directory to point to the RVD. In one embodiment, after the RVD moving component 914 moves the RVDs to TCVM directories, for example, the repository can be removed from the TCVM database 950B.

In one embodiment, the RVD creation component 912 can use datastore locations determined for the SVBM and the TCVM to clone the SBVM VD from a first controller 902 to a temporary directory of a second controller 956, if the TCVM datastore is disposed on the second controller 956 and the SBVM is disposed on the first controller 902 (e.g., where the first and second controllers not compatible, such as from different manufactures). For example, a VM clone of the SBVM can be created in the temporary directory of the second controller, and merely the virtual drive(s) of the clone can be kept and the remaining components removed.

Further, the RVD creation component 912 can use datastore locations determined for the SVBM and the TCVM to perform a controller-based copy of the SBVM VD to the datastore 950B comprising the TCVM 954 if the datastore comprising the TCVM is disposed on a different volume than the SBVM on the same controller (e.g., or on different compatible controllers). Additionally, the RVD creation component 912 can use datastore locations determined for the SVBM and the TCVM to perform data-container level cloning (e.g., file-level cloning) of the SBVM VD if the TCVM and the SBVM are disposed in a same datastore 950.

Figure 10:
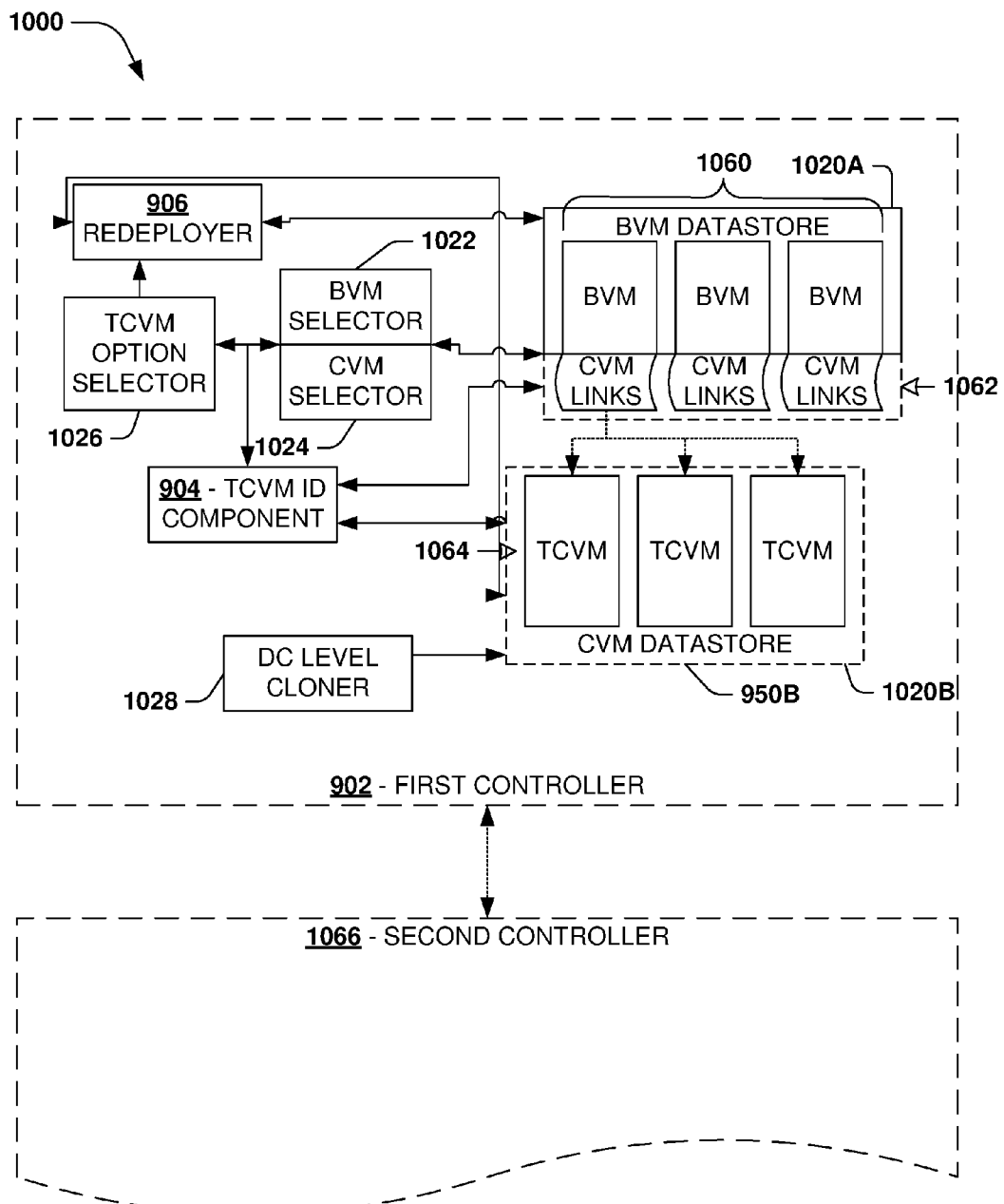
FIG. 10 is a component diagram illustrating one embodiment implementing one or more of the systems described herein.

FIG. 10 is a component diagram illustrating one embodiment 1000 implementing the systems described herein. Here, the controller device 902, such as a first controller, comprises a baseline datastore 1020A that is operably coupled with the TCVM identification component 904. The baseline datastore 1020A can store a copy of the BVM 1060, and may also, or alternately, store an association 1062 between the BVM and one or more CVMs in order to from which BVM the CVM was cloned. In one embodiment, the BVM datastore 1020A can store a plurality of BVMs 1060 and/or CVM associations 1062. In another embodiment, the DVM associations may be stored in an application and/or database used in the VM redeployment, and are not limited to any particular embodiment.

A BVM selection component 1022 is operably coupled with the TCVM identification component 904, and it provides a means for selection of a BVM 1060 from a plurality of BVMs stored in the baseline datastore 1020A. For example, the BVM selection component 1022 can provide a user interface (not shown) that allows a user/administrator to select a BVM from a plurality of BVMs 1060. Further, a CVM selection component 1024 is also operably coupled with the TCVM identification component 904, which can provide for selecting one or more TCVMs 1064 from a plurality of CVMs associated with the selected BVM. As an example, the CVM selection component 1024 can provide an UI for the selection, A TCVM option selection component 1026 is operably coupled with the redeployment component 906, to provide for selection of one or more CVM options for the TCVM prior to redeployment. The TCVM option selection component 1026 can provide a UI that allows a user/administrator to select options for the redeployment of the BVM, such as power options or customizations for the TCVM. In one embodiment, the BVM selection component 1022, CVM selection component 1024, and the TCVM option selection component 1026 may be coupled together to provide a UI that allows a user/administrator to select BVM and TCVMs, select TCVM options, and/or customize other parts of the redeployment system. In another embodiment, these selection components 1026, 1024, and 1022 may provide automated selection, for example, by programmatically selection a BVM, TCVMs and TCVM options based on some predefined criteria for the redeployment operation.

A data-container level cloning component 1028 can create one or more second clones of the RVD, for one or more second TCVMs 1064, from the RVD in the temporary directory of the TCVM data store 950B. For example, referring to FIG. 7, the data-container level cloning component 1028 can clone 714 a first RVD, which is a clone/copy of the source VDs 706, a number of times so that the repository 708 comprises a number of RVDs corresponding to a number of TCVMs 710.

Figure 11:
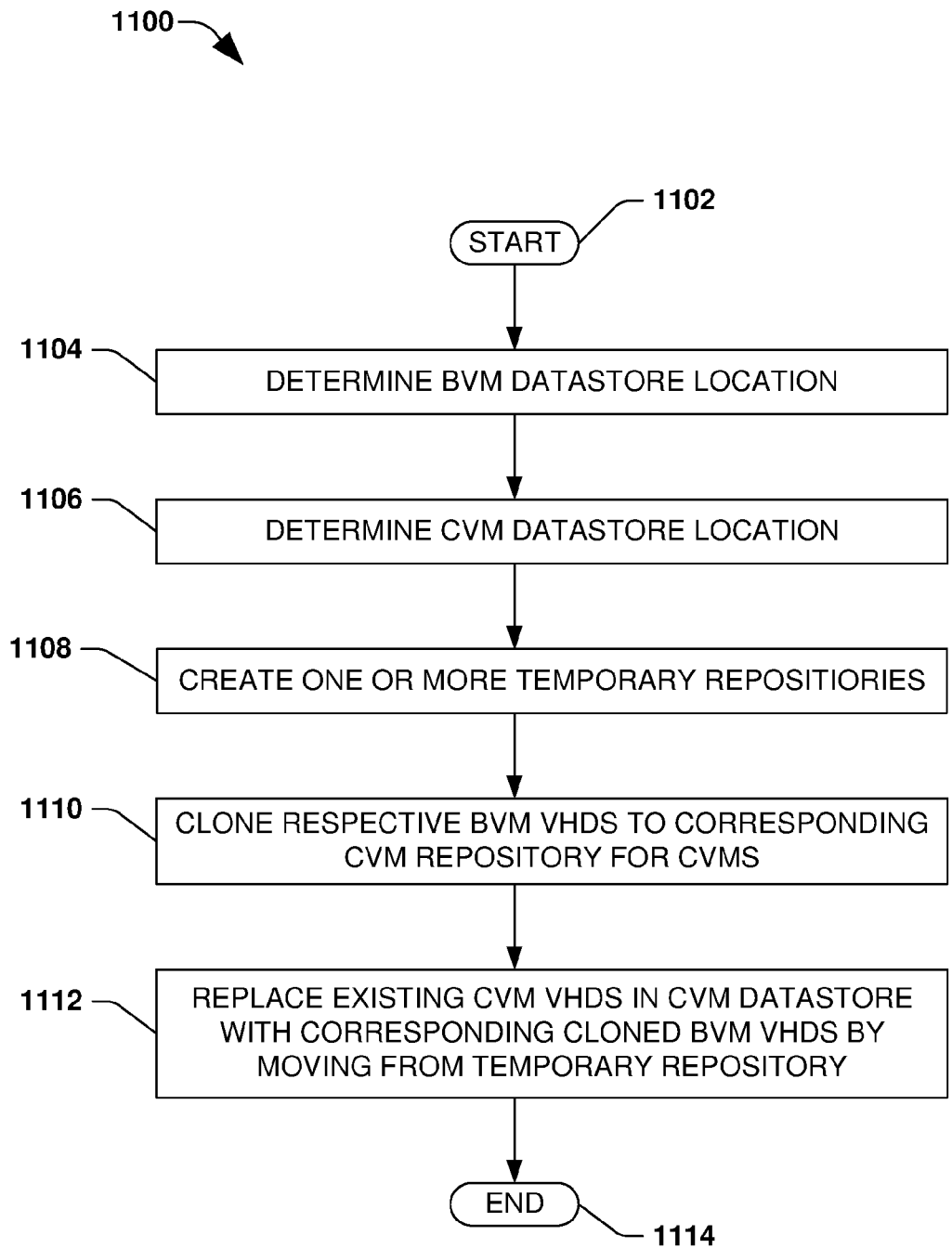
FIG. 11 is a flow diagram of an example alternate method for redeploying a baseline virtual machine to one or more children virtual machines.

An alternate method may be devised for rolling out source virtual drives to target virtual drives, such as in a distributed data storage and management system (cluster). FIG. 11 is a flow diagram of an example alternate method 1100 for redeploying a baseline virtual machine to one or more children virtual machines. The example method 1100 begins at 1102 and involves determining a datastore location of a baseline virtual machine (BVM) that is a source for redeployment of one or more virtual drives (VDs), at 1104. For example, a controller from which the VDs are being redeployed can identify the datastore location of the source BVM (SBVM).

At 1106, a datastore location of one or more children virtual machines (CVMs) is determined, where the CVMs are a target for redeployment of the one or more VDs, and where the one or more CVMs are children of the BVM (e.g., clones of the BVM initially deployed). As an example, the controller from which the VDs are being redeployed can also identify the datastore locations of the target CVMs (TCVMs), such as by reviewing metadata attached to the TCVMs that identifies the SBVM.

At 1108, one or more temporary repositories, corresponding to a number of VDs in the SBVM, can be created in the datastore for the respective one or more TCVMs. For example, a temporary directory can be used to temporarily store replacement VDs, which are clones/copies of the source VDs (SVDs). In this example, a temporary directory can be created in the datastores that comprise the TCVM, and, if there are more TCVMs on other databases, temporary directories can be created on each of the other databases.

At 1110, the BVM VDs (e.g., source VDs) can be cloned/copied into a corresponding CVM temporary repository for the respective CVMs. That is, a clone or copy of the SBVM's VDs (e.g., a clone of each drive in the SBVM) can be created in the temporary directory corresponding to TCVMs, for each of the TCVMs. Therefore, in this example, each TCVM has corresponding replacement VDs in the temporary that are clones of the SVDs.

At 1112, the one or more existing CVM VDs (e.g., existing in the TCVM's directory prior to redeployment) are replaced by the corresponding one or more cloned BVM VDs (e.g., source VDs in the repository of the TCVM's datastore) by moving the cloned BVM VD from the temporary repository to a CVM VD location in the datastore (the TCVM's directory. In one embodiment, moving the replacement VDs to the TCVM's directory can be done by changing a pointer in the TCVM's directory to point to a location of the RVD instead of the TCVM's existing VD. Further, in one embodiment, the temporary repository can be removed after the RVDs have been redeployed to the TCVM's directories.

Having redeployed the source BVM to the target CVM(s), the example method 1100 ends at 1114.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 12:
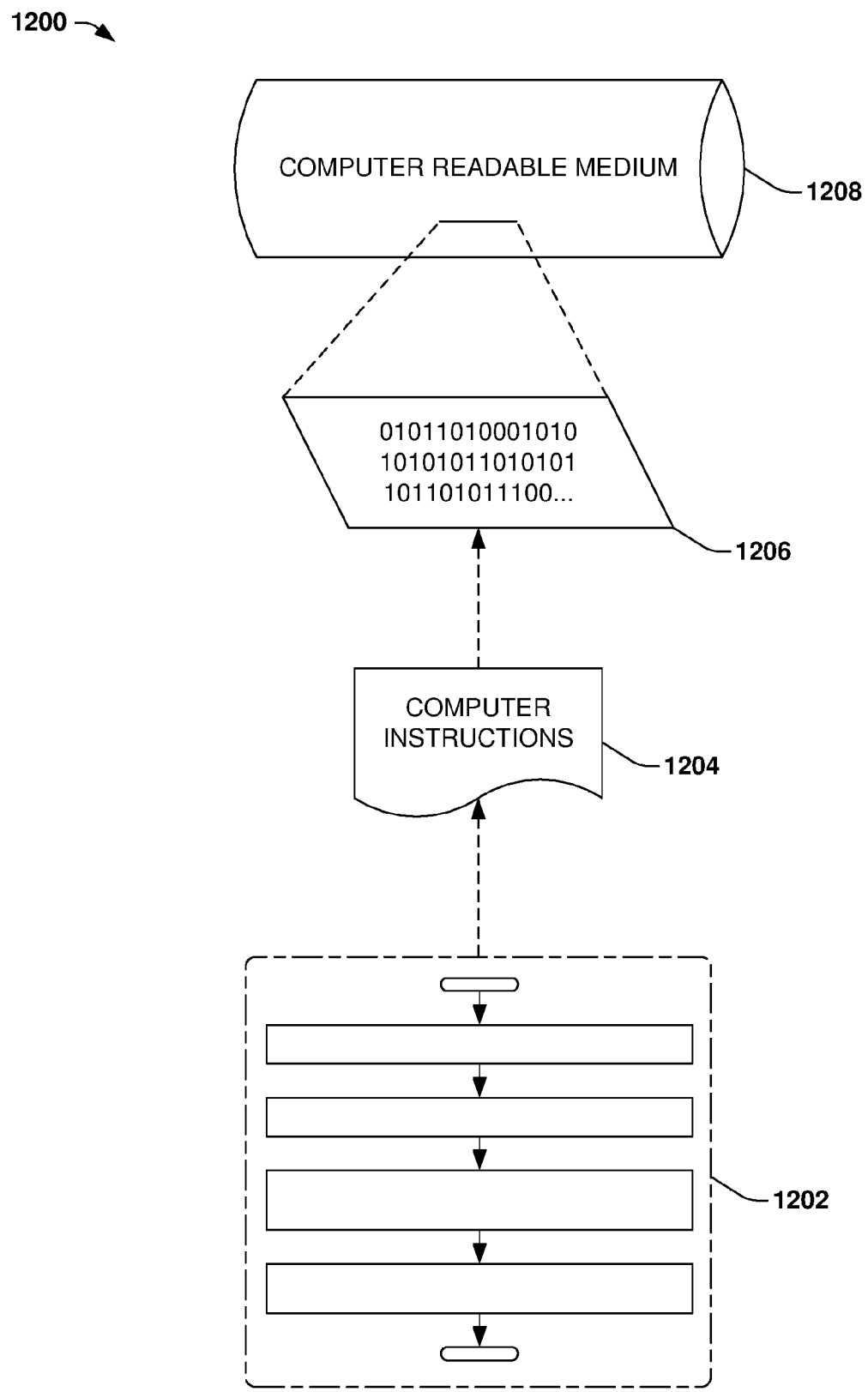
FIG. 12 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 12, where the implementation 1200 comprises a computer-readable medium 1208 (e.g., a CD-R, DVD-R, or a platter of a hard disk drive), on which is encoded computer-readable data 1206. This computer-readable data 1206 in turn comprises a set of computer instructions 1204 configured to operate according to the principles set forth herein. In one such embodiment, the processor-executable instructions 1204 may be configured to perform a method 1202, such as the method 300 of FIG. 3 or method 1100 of FIG. 11, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method, comprising:
triggering a redeployment of a baseline virtual machine to a child virtual machine associated with the baseline virtual machine based upon a threshold number of updates being applied to the baseline virtual machine, the redeploying comprising:
creating a directory on a datastore;
creating a clone of a baseline virtual machine drive, used by the baseline virtual machine to store data, as a replacement virtual drive within the directory using a host-based copy mechanism based upon a determination that the baseline virtual machine is disposed on a first controller and the child virtual machine is disposed on a second controller; and
replacing an existing child virtual machine drive, used by the child virtual machine to store data, with the replacement virtual drive by changing a pointer of the child virtual machine to point to the replacement virtual drive.

2. The method of claim 1, wherein the creating a clone comprises:
performing a controller-based copy of the baseline virtual machine drive to the directory based upon a determination that the baseline virtual machine is disposed on the first controller having a first controller type and the child virtual machine is disposed on the second controller having the first controller type, wherein the controller-based copy is a copy operation between the first controller and the second controller.

3. The method of claim 1, wherein the creating a clone comprises:
performing a controller-based copy of the baseline virtual machine drive to the directory of the datastore based upon a determination that the baseline virtual machine is comprised within a first volume of the first controller and the child virtual machine is comprised within a second volume of the first controller.

4. The method of claim 1, wherein the creating a clone comprises:
performing a data-container cloning of the baseline virtual machine drive based upon a determination that the baseline virtual machine is comprised within the datastore and the child virtual machine is comprised within the datastore, wherein the data-container cloning clones a data container comprising the baseline virtual machine drive within the datastore.

5. The method of claim 1, wherein the creating a clone comprises:
performing a block level cloning of the baseline virtual machine drive based upon a determination that the baseline virtual machine is comprised within the datastore and the child virtual machine is comprised within the datastore, wherein the block level cloning clones data blocks of the baseline virtual machine drive.

6. The method of claim 1, wherein the creating a clone comprises:
performing sparse-aware copying of the baseline virtual machine drive, wherein the sparse-aware copying copies non-empty sections of the baseline virtual machine and skips copying empty sections of the baseline virtual machine.

7. The method of claim 1, comprising:
interrogating the baseline virtual machine drive to determine that a file system of the datastore can align with a first controller comprising the baseline virtual machine.

8. The method of claim 1, comprising:
triggering the redeployment based upon a determination that the child virtual machine has become corrupted.

9. The method of claim 1, comprising:
configuring the replacement virtual drive with a CPU setting to apply to the child virtual machine.

10. The method of claim 1, comprising:
configuring the replacement virtual drive with a memory setting to apply to the child virtual machine.

11. A computing device comprising:
a memory having stored thereon instructions for performing a method; and
a processor coupled to the memory, the processor configured to execute the instructions to cause the processor to:
trigger a redeployment of a baseline virtual machine to a child virtual machine associated with the baseline virtual machine based upon a threshold number of updates being applied to the baseline virtual machine, comprising:
creating a directory on a datastore;
creating a clone of a baseline virtual machine drive, used by the baseline virtual machine to store data, as a replacement virtual drive within the directory using a host-based copy mechanism based upon a determination that the baseline virtual machine is disposed on a first controller and the child virtual machine is disposed on a second controller; and
replacing an existing child virtual machine drive, used by the child virtual machine to store data, with the replacement virtual drive by changing a pointer of the child virtual machine to point to the replacement virtual drive.

12. The computing device of claim 11, wherein the instructions cause the processor to:
perform a data-container cloning of the baseline virtual machine drive to create the replacement virtual drive based upon a determination that the baseline virtual machine is comprised within the datastore and the child virtual machine is comprised within the datastore, wherein the data-container cloning clones a data container comprising the baseline virtual machine drive within the datastore.

13. The computing device of claim 11, wherein the instructions cause the processor to:
interrogate the baseline virtual machine drive to determine that a file system of the datastore can align with a first controller comprising the baseline virtual machine.

14. The computing device of claim 11, wherein the instructions cause the processor to:
configure the replacement virtual drive with a memory setting to apply to the child virtual machine.

15. The computing device of claim 11, wherein the instructions cause the processor to:
perform a block level cloning of the baseline virtual machine drive based upon a determination that the baseline virtual machine is comprised within the datastore and the child virtual machine is comprised within the datastore, wherein the block level cloning clones data blocks of the baseline virtual machine drive.

16. The computing device of claim 11, wherein the instructions cause the processor to:
configure the replacement virtual drive with a power setting to apply to the child virtual machine.

17. A non-transitory machine readable medium having stored thereon instructions that when executed by a machine causes the machine to:
trigger a redeployment of a baseline virtual machine to a child virtual machine associated with the baseline virtual machine based upon a threshold number of updates being applied to the baseline virtual machine, comprising:
creating a directory on a datastore;
creating a clone of a baseline virtual machine drive, used by the baseline virtual machine to store data, as a replacement virtual drive within the directory using a host-based copy mechanism based upon a determination that the baseline virtual machine is disposed on a first controller and the child virtual machine is disposed on a second controller; and
replacing an existing child virtual machine drive, used by the child virtual machine to store data, with the replacement virtual drive by changing a pointer of the child virtual machine to point to the replacement virtual drive.

18. The non-transitory machine readable medium of claim 17, wherein the instructions cause the machine to:
configure the replacement virtual drive with a power setting to apply to the child virtual machine.

19. The non-transitory machine readable medium of claim 17, wherein the instructions cause the machine to:
trigger the redeployment based upon a determination that the child virtual machine has become corrupted.

20. The non-transitory machine readable medium of claim 17, wherein the instructions cause the machine to:
perform a data-container cloning of the baseline virtual machine drive based upon a determination that the baseline virtual machine is comprised within the datastore and the child virtual machine is comprised within the datastore, wherein the data-container cloning clones a data container comprising the baseline virtual machine drive within the datastore.

* * * * *